(12) United States Patent
Reinhart et al.

(10) Patent No.: US 9,939,050 B2
(45) Date of Patent: Apr. 10, 2018

(54) PRESSURE SENSOR FOR POWER TAKE OFF

(71) Applicant: GM Global Technology Operations LLC, Detroit, MI (US)

(72) Inventors: Timothy J. Reinhart, Lake Orion, MI (US); Christopher G. Benson, Rochester Hills, MI (US); Timothy Z. Jin, Pleasant Ridge, MI (US); Brady Stein, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 15/047,160

(22) Filed: Feb. 18, 2016

(65) Prior Publication Data

US 2017/0241520 A1 Aug. 24, 2017

(51) Int. Cl.

| | |
|---|---|
| *B60K 25/02* | (2006.01) |
| *F16H 7/08* | (2006.01) |
| *F16D 48/02* | (2006.01) |
| *F16H 7/06* | (2006.01) |
| *G01L 19/08* | (2006.01) |
| *F16D 13/52* | (2006.01) |
| *F16H 41/24* | (2006.01) |

(52) U.S. Cl.
CPC ............ *F16H 7/0827* (2013.01); *B60K 25/02* (2013.01); *F16D 25/14* (2013.01); *F16H 7/06* (2013.01); *G01L 19/08* (2013.01); *B60K 2025/022* (2013.01); *B60Y 2200/14* (2013.01); *B60Y 2200/142* (2013.01); *B60Y 2400/306* (2013.01); *B60Y 2400/424* (2013.01); *F16D 13/52* (2013.01); *F16D 2300/18* (2013.01); *F16D 2500/3024* (2013.01); *F16H 41/24* (2013.01)

(58) Field of Classification Search
CPC .......... F16H 7/0827; F16H 7/06; F16H 41/24; F16D 13/52; F16D 2300/18; F16D 2500/3024; B60K 25/02; B60K 2025/022
See application file for complete search history.

(56) References Cited

U.S. PATENT DOCUMENTS

| | | | |
|---|---|---|---|
| 2016/0176288 A1* | 6/2016 | Kempf ................... | B60K 17/28 74/11 |
| 2017/0203652 A1* | 7/2017 | Ketchel ................ | B60K 17/342 |

* cited by examiner

*Primary Examiner* — Faye M Fleming

(57) ABSTRACT

The present invention provides improved, real time sensing of pressure supplied to the hydraulic operator of a clutch for a motor vehicle driveline power take off. A proportional sensor in the hydraulic line to the power take off clutch actuator provides a data signal in real time of the actual pressure applied to the clutch actuator. This signal is provided to the power take off control module (PCM) and/or to the transmission control module (TCM). The power take off control module, having instantaneous data regarding the pressure applied to the hydraulic operator achieves two important operating functions: monitoring and feedback.

20 Claims, 3 Drawing Sheets

PRESSURE SENSOR FOR POWER TAKE OFF

FIELD

The present disclosure relates to sensors for use with a hydraulic clutch power take off (PTO) and more particularly to proportional pressure sensors for use with heavy duty transmission hydraulic clutch driveline power take offs.

BACKGROUND

The statements in this section merely provide background information related to the present disclosure and may or may not constitute prior art.

With many heavy duty trucks having heavy duty transmissions, it is commonplace to have power take off components associated with the driveline. Such components generally comprehend a selectively engageable clutch, a drive gear, an idler gear and a driven gear that, when the clutch is engaged, transfer torque from the driveline axis to an axis offset from and parallel to the driveline axis and thence to a shaft or other torque transfer component.

Typically, such clutches have hydraulic operators. Typically, as well, it is accepted power take off design practice to include a two position pressure switch associated with the hydraulic fluid pressure provided to the hydraulic clutch actuator to provide an on/off or go/no go signal to a PTO controller or other electronic control module (ECM) indicating or confirming that pressure has been applied to the clutch. While such pressure switch is set to change state at a pressure indicating assured clutch engagement, wear of such components and other variables such as fluid temperature and age can and generally will change the operating point of the clutch or switch over time. From the standpoint of accurate and repeatable information regarding the state of the power take off, this inaccuracy is undesirable.

SUMMARY

The present invention provides improved, real time sensing of pressure supplied to the hydraulic operator of a clutch for a driveline power take off. A proportional sensor in the hydraulic line to the clutch actuator provides a data signal in real time of the actual pressure applied to the clutch actuator. This signal is provided to the power take off control module (PCM) and to the transmission control module (TCM). The power take off control module, having instantaneous data regarding the pressure applied to the hydraulic operator achieves two important operating functions: monitoring and feedback. First of all, it may confirm as well as monitor in real time that sufficient and appropriate pressure has been and is being provided to the hydraulic actuator to ensure proper clutch engagement. Second of all, the data may be utilized to adjust the pressure upward or downward to ensure proper clutch engagement. Of course, the data may be also utilized to provide a safety indication that insufficient pressure is available to engage the clutch without slipping or to engage it at all. Thus, the overall performance and safety of a power take off equipped with a proportional hydraulic clutch pressure sensor will be improved.

Thus it is an aspect of the present invention to provide improved pressure sensing of pressure supplied to the hydraulic operator of a clutch for a driveline power take off.

It is a further aspect of the present invention to provide improved, real time sensing of pressure supplied to the hydraulic operator of a clutch for a driveline power take off.

It is a still further aspect of the present invention to provide improved, real time sensing of pressure supplied to the hydraulic operator of a clutch for a driveline power take off of a heavy duty transmission.

It is a still further aspect of the present invention to provide a proportional pressure sensor for hydraulic fluid supplied to the hydraulic operator of a clutch for a driveline power take off.

It is a still further aspect of the present invention to provide a real time proportional pressure sensor for hydraulic fluid supplied to the hydraulic operator of a clutch for a driveline power take off.

It is a still further aspect of the present invention to provide real time proportional data from a pressure sensor for hydraulic fluid supplied to the hydraulic operator of a driveline power take off clutch to a power take off control module (PCM).

It is a still further aspect of the present invention to provide a real time proportional data from a pressure sensor for hydraulic fluid supplied to the hydraulic operator of a driveline power take off clutch for heavy duty transmissions to a power take off control module (PCM).

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
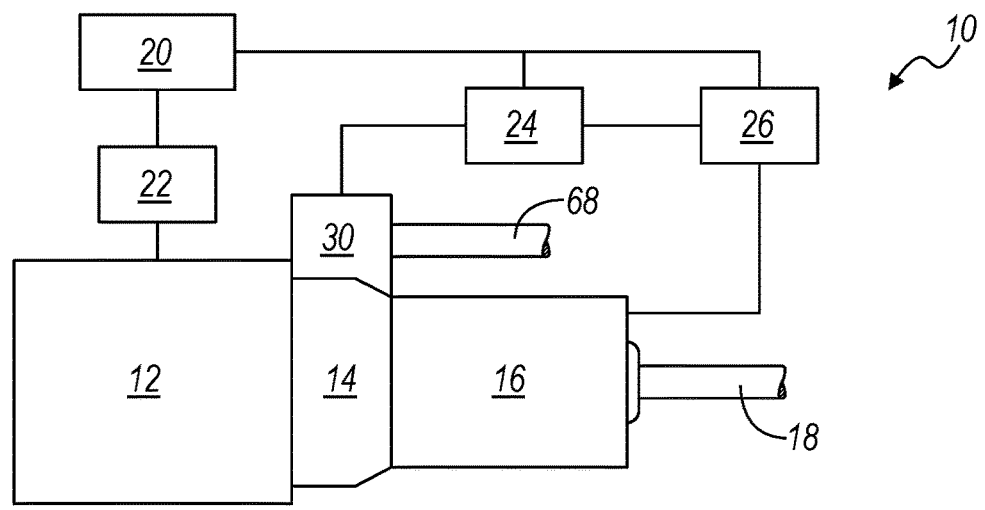
FIG. 1 is a schematic diagram of an internal combustion engine, transmission, power take off assembly and associated controls incorporating the present invention.

With reference to FIG. 1, a portion of a motor vehicle driveline assembly, typically, but not necessarily, for a heavy duty truck is illustrated and generally designated by the reference number 10. The driveline assembly 10 includes and internal combustion engine 12 which may be a gasoline, Diesel or flex fuel engine. The output of the engine 12 is coupled to and drives a torque converter 14 which, in turn, has an output which is coupled to and drives an automatic transmission 16. The transmission 16 includes numerous shafts, planetary gear assemblies, clutches, brakes and associated components (all not illustrated) which provide a sequence of a plurality of forward speeds or gear ratios and reverse to an output or prop shaft 18. While the transmission 16 just described is, as noted, an automatic transmission, it should be appreciated that the invention is equally adapted to and suitable for use with a manual transmission, in which case, among other details, the torque converter is replaced by a main friction clutch.

Typically, the system includes a driver interface 20 which accepts inputs such as accelerator pedal position, gear selection, power take off activation and the like from the vehicle operator (not illustrated) and provides such data and information to an engine control module (ECM) 22 which controls operation of the engine 12. Data and information for the driver interface 20 is also provided to a power take off control module (PCM) 24. Both the driver interface 20 and the power take off control module 24 communicate with a transmission control module (TCM) 26. The power take off control module 24 provides control signals to and receives data and information from a power take off assembly 30. Similarly, the transmission control module 26 provides control signals to and receives data and information from actuators and sensors within the transmission 16.

Figure 2:
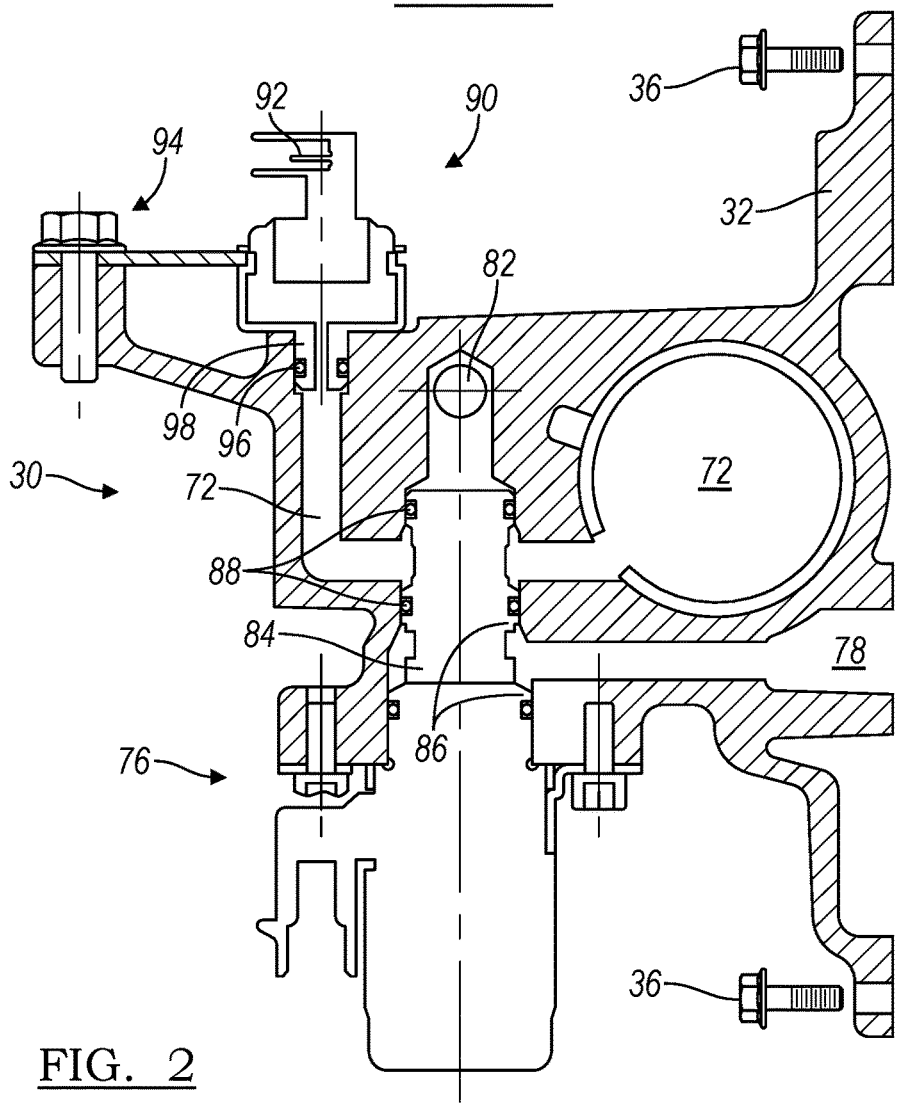
FIG. 2 is a fragmentary section view of a power take off control valve and sensor assembly according to the present invention.
Figure 3:
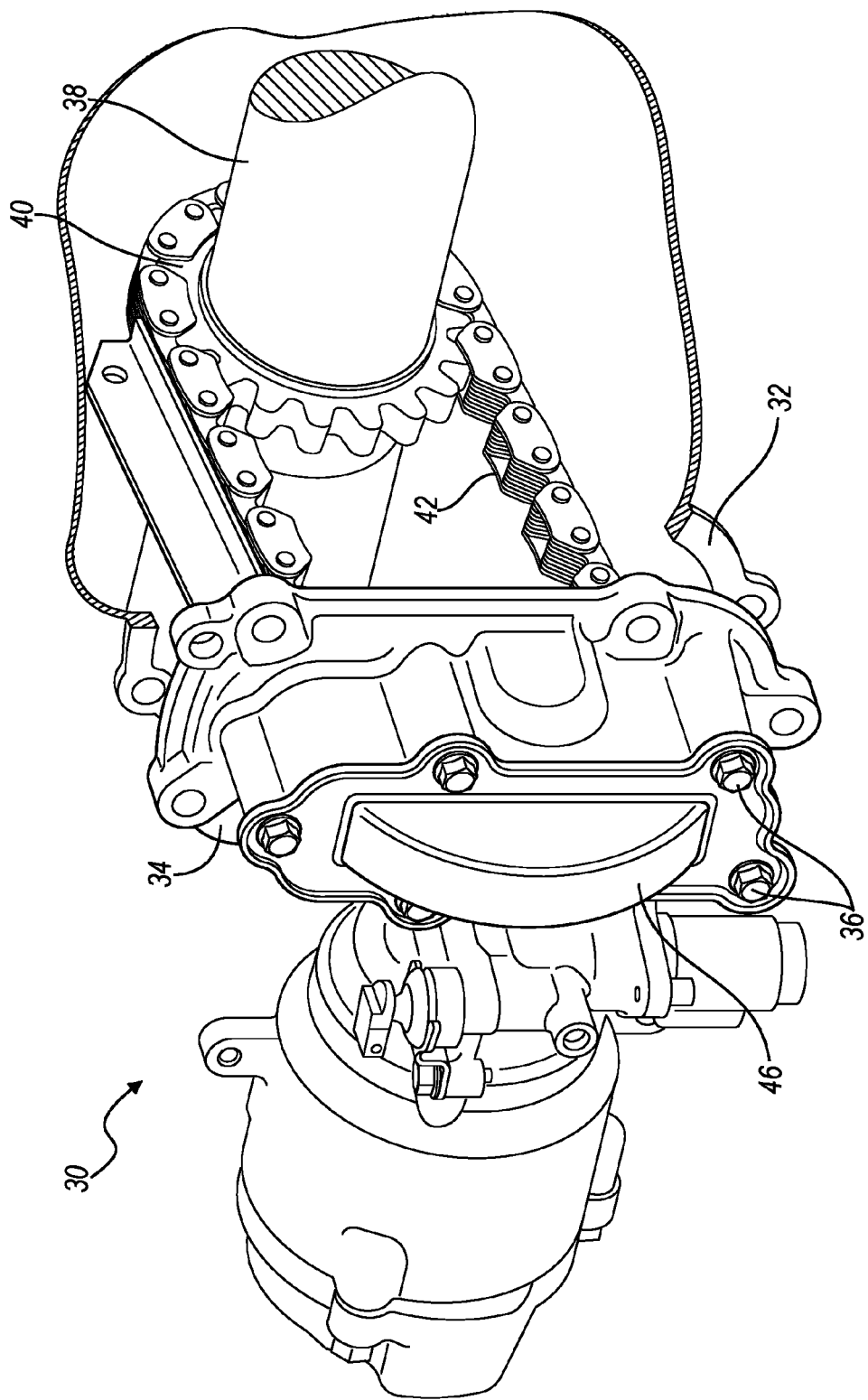
FIG. 3 is a perspective view of a power take off and sensor assembly according to the present invention.
Figure 4:
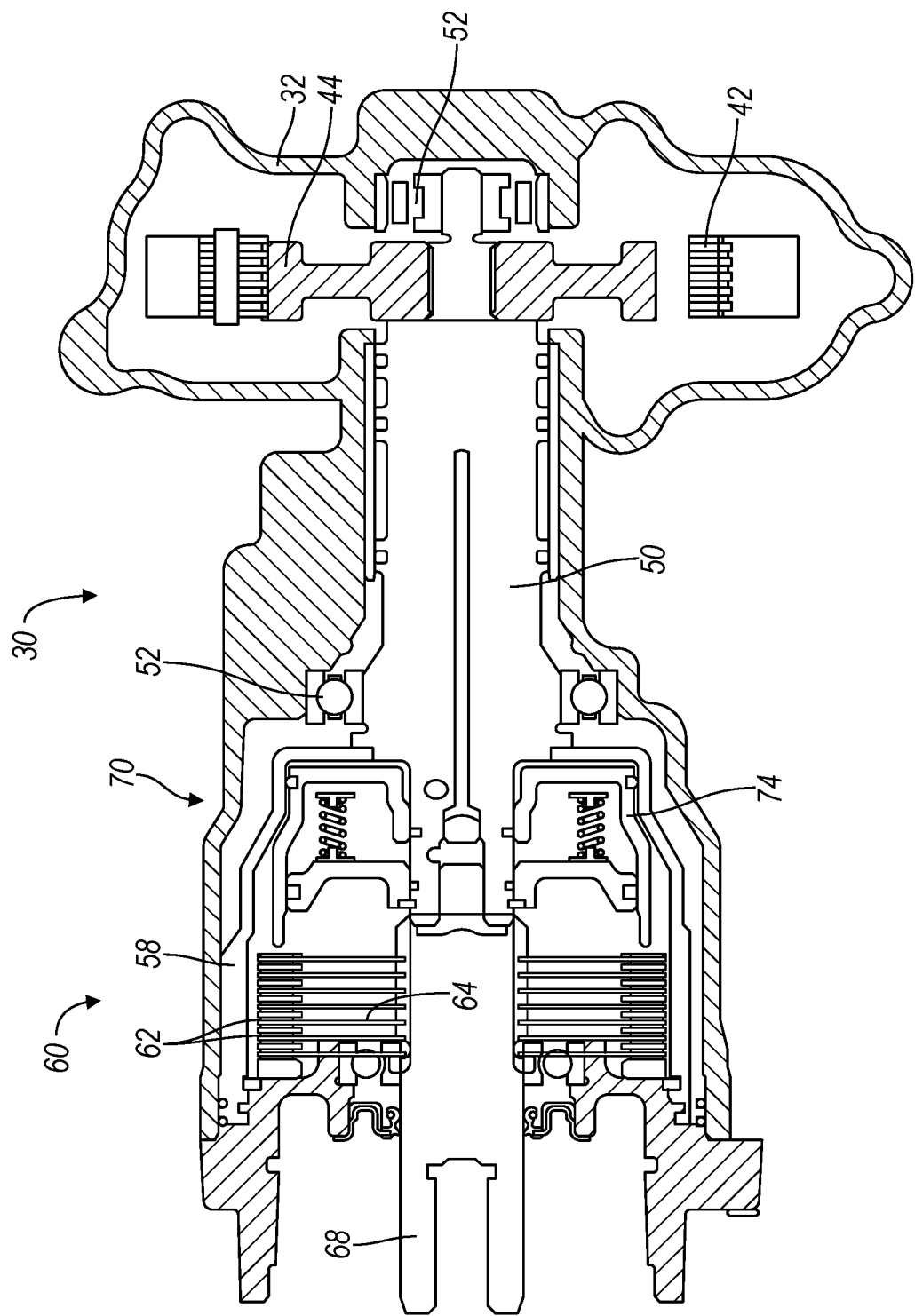
FIG. 4 is a full sectional view of a power take off assembly incorporating the present invention.

Turning now to FIGS. 2, 3 and 4, the torque converter 14 and the automatic transmission 16 reside within a first housing 32 and the power take off assembly 30 includes a second housing 34 which is typically cast metal and which is secured to the outside of the first, torque converter and transmission housing 32 by a plurality of threaded fasteners 36. The engine 12 includes a shaft 38 which, as noted above, drives the input (pump) of the torque converter 14 and is thus both the output shaft of the engine 12 and the input shaft of the torque converter 14. Thus, the shaft 38 is rotating whenever the engine 12 is operating. Secured to the shaft 38 is a first, drive chain sprocket 40 which is partially surrounded and engaged by a multi-link chain 42. The multi-link chain 42 also partially surrounds and engages a second, driven chain sprocket 44. The power take off housing 34 may include an access cap or cover 46 also secured by threaded fasteners 36 which protects the second, driven chain sprocket 44 and seals and closes the second, power take off housing 34 and the first, torque converter and transmission housing 32. The second, driven chain sprocket 44 is secured to a drive shaft 50 which is supported by suitable anti-friction bearings 52. It will be appreciated that the two chain sprockets 40 and 44 and the chain 42 may be replaced by other parallel shaft, power transfer devices such as spur or helical gears or a timing chain. In the case of gears, of course, the driven shaft, such as the drive shaft 50, will rotate in the opposite direction from the drive shaft unless an intermediate or idler gear is also utilized.

The drive shaft 50 is typically and preferably disposed on an axis parallel to and spaced from an axis of the shaft 38 of the engine 12 and the torque converter 14. The drive shaft 50 is coupled to by, for example, interengaging splines, and drives an outer housing 58 of a friction clutch assembly 60. The friction clutch assembly 60 includes a plurality of first or reaction discs or plates 62 coupled for rotation by interengaging splines with the outer housing 58 and a plurality of interleaved second or friction discs or plates 64 coupled by interengaging splines for rotation with an output shaft 68 to which additional shafts or couplings and equipment (not illustrated) are connected to be driven by the power take off assembly 30. It will be appreciated that the arrangement of the reaction plates 62 and the friction discs 64 may be altered, with the friction discs 64 coupled to the outer housing 58 and the reaction plates 62 coupled to the output shaft 68. The output shaft 68 is preferably piloted on the drive shaft 50. The friction clutch assembly 60 also includes a hydraulic operator 70 disposed concentrically about the drive shaft 50.

Referring now to FIGS. 2 and 4, the hydraulic operator 70 is selectively provided with pressurized hydraulic fluid through a first or inlet passageway 72. The first or inlet passageway 72 provides pressurized fluid to a piston 74 of the hydraulic operator 70 from a three position solenoid valve 76. A second or supply passageway 78 provides pressurized hydraulic fluid to the solenoid valve 76 from a source such as a hydraulic pump (not illustrated) in the transmission 16. A third passageway 82 associated with the solenoid valve 76 is an exhaust passageway which communicates with and returns hydraulic fluid to a transmission sump (not illustrated). The three position solenoid valve 76 includes a spool or plunger 84 with two lands 86 and suitable O-ring seals 88.

Also in fluid communication with the first or inlet passageway 72 and the hydraulic operator 70 is a proportional pressure sensor 90. The pressure sensor 90 provides a continuous, typically analog, electrical output or signal from a resistance element on terminals 92 to, for example, the power take off control module (PCM) 24 directly proportional to the hydraulic pressure in the first passageway 72 and that applied to the hydraulic operator 70. The pressure sensor 90 is secured to the housing 32 of the power take off assembly 30 by a bracket and threaded fastener 94 and includes an O-ring seal 96 or similar structure to seal the input or inlet fitting 98 of the pressure sensor 90 within the first or inlet passageway 72. It should be appreciated that the input or inlet fitting 98 of the pressure sensor 90 may also include male threads which secure the sensor 90 in complementary female threads in the first passageway 72.

In operation, from a first, quiescent or de-energized position illustrated in FIG. 2, the spool 84 of the three position solenoid valve 76, which is preferably controlled by the power take off control module 24, is moved downward (in FIG. 2) to a second position which provides pressurized hydraulic fluid to the first passageway 72 and thus to the piston 74 of the hydraulic operator 70 and the pressure sensor 90. The actual pressure in the passageway 72 which is applied to the hydraulic operator 70 is thus measured in real time by the pressure sensor 90 and provided to the power take off control module 24. In a third, lowermost position, the spool 84 and the lands 86 close off the second passageway 78 and connect the first passageway 72 with the third, exhaust passageway 82 to release pressure and fluid from the hydraulic operator 70 and the pressure sensor 90 and return it to the sump, thereby disengaging the friction clutch assembly 60.

It will be appreciated that the first position of the spool, illustrated in FIG. 2 maintains fluid pressure in the passageway 72 (and the hydraulic operator 70 and the sensor 90) if it is moved directly from the second position to the first, quiescent or de-energized position. Thus, not only can electrical power consumption and heat generation in the solenoid valve 76 be reduced while maintaining operating hydraulic pressure on the hydraulic clutch operator 70 and engagement of the friction clutch assembly 60, but such pressure may be monitored by the pressure sensor 90 to ensure proper pressure and engagement of the friction clutch assembly 60 are maintained.

As noted above, the proportional pressure sensor 90 provides improved overall operation of the power take off assembly 30 as well as the transmission 16 by providing a constant data stream of the actual instantaneous or real time pressure applied to the friction clutch assembly 60 of the power take off assembly 30. The pressure feedback provided by the pressure sensor 90 to the power take off control module (PCM) 24 and the transmission control module (TCM) 26 may be utilized to boost or adjust the line pressure provided to the solenoid valve 76. It may also be utilized to provide improved diagnostics and safety during every phase of PTO operation, such as monitoring the fluid pressure prior to and during clutch engagement or to increase line pressure to increase torque transfer across the friction clutch assembly 60.

The description of the invention is merely exemplary in nature and variations that do not depart from the gist of the invention are intended to be within the scope of the invention. Such variations are not to be regarded as a departure from the spirit and scope of the invention.

What is claimed is:

1. A power take off assembly for a motor vehicle transmission comprising, in combination,
    an output shaft defining a first axis and a first chain sprocket secured to said output shaft,
    a second chain sprocket disposed on a second axis parallel to and spaced from said first axis and a chain engaging said first chain sprocket and said second chain sprocket,
    a hydraulic clutch having an input coupled to said second chain sprocket and an output,
    a multiple position solenoid valve adapted to selectively provide pressurized hydraulic fluid to said clutch, and
    a proportional pressure sensor for providing a signal representing the hydraulic pressure applied to said hydraulic clutch from said solenoid valve.

2. The power take off assembly of claim 1 wherein said multiple position solenoid valve has three positions.

3. The power take off assembly of claim 1 wherein said chain is a multi-link chain.

4. The power take off assembly of claim 1 further including a power take off control module that receives said continuous signal from said proportional pressure sensor.

5. The power take off assembly of claim 1 wherein said clutch includes a plurality of reaction plates interleaved with a plurality of friction discs.

6. The power take off assembly of claim 1 further including a drive shaft operably disposed between said second chain sprocket and said input of said hydraulic clutch.

7. The power take off assembly of claim 6 wherein said engine output shaft and said drive shaft are disposed on parallel, spaced apart axes.

8. A power take off assembly for a motor vehicle transmission comprising, in combination,
    an engine output shaft defining a first axis,
    a driven shaft disposed on a second axis parallel to and spaced from said first axis,
    means operably disposed between said output shaft and said driven shaft for transferring torque between said shafts,
    a clutch having a hydraulic operator and an input coupled to said driven shaft and an output,
    a multiple position solenoid valve adapted to selectively provide pressurized hydraulic fluid to said hydraulic operator of said clutch, and
    a proportional pressure sensor for providing a continuous signal corresponding to the hydraulic pressure applied to said hydraulic operator of said clutch from said solenoid valve.

9. The power take off assembly of claim 8 wherein said multiple position solenoid valve has three positions: quiescent, fill and exhaust.

10. The power take off assembly of claim 8 wherein said means for transferring torque is a chain sprocket disposed on both said engine shaft and said driven shaft and a chain engaging said sprockets.

11. The power take off assembly of claim 8 further including a power take off control module that receives said continuous signal from said proportional pressure sensor.

12. The power take off assembly of claim 8 wherein said clutch includes a hydraulic operator and a plurality of reaction plates interleaved with a plurality of friction discs.

13. The power take off assembly of claim 8 further including a torque converter having an input and said input is coupled to said engine output shaft.

14. The power take off assembly of claim 8 wherein said multiple position solenoid valve includes a spool having at least two lands and O-ring seals.

15. A power take off assembly for a motor vehicle transmission comprising, in combination,
    a torque converter having a first housing defining an interior and an exterior,
    a torque converter input shaft and a drive chain sprocket secured to said input shaft, said shaft and said drive chain sprocket disposed within said interior of said housing,
    a driven chain sprocket disposed in a second housing and a chain engaging said drive chain sprocket and said driven chain sprocket, said driven chain sprocket and said second housing disposed on said exterior of said first housing,
    a hydraulic clutch having an input coupled to said driven chain sprocket and an output,
    a multiple position solenoid valve adapted to selectively provide and release pressurized hydraulic fluid to said clutch, and
    a proportional pressure sensor for providing a continuous signal representing the hydraulic pressure applied to said hydraulic clutch from said solenoid valve.

16. The power take off assembly of claim 15 wherein said multiple position solenoid valve has three positions: off, fill and exhaust.

17. The power take off assembly of claim 15 wherein said chain is a multi-link chain.

18. The power take off assembly of claim 15 further including a power take off control module that receives a signal from said proportional pressure sensor.

19. The power take off assembly of claim 15 wherein said hydraulic clutch includes a piston and a plurality of reaction plates interleaved with a plurality of friction discs.

20. The power take off assembly of claim 15 further including a drive shaft operably disposed between said driven chain sprocket and said input of said hydraulic clutch.

* * * * *